US011899814B1

(12) United States Patent
Hustad et al.

(10) Patent No.: US 11,899,814 B1
(45) Date of Patent: Feb. 13, 2024

(54) METHOD AND SYSTEM FOR PROVIDING CONTROL OVER STORAGE OF AND ACCESS TO USER DATA

(71) Applicants: Arthur Hustad, Nienhagen (DE); Wolfgang Schreiner, Walding (AT)

(72) Inventors: Arthur Hustad, Nienhagen (DE); Wolfgang Schreiner, Walding (AT)

( * ) Notice: Subject to any disclaimer, the term of this patent is extended or adjusted under 35 U.S.C. 154(b) by 0 days.

(21) Appl. No.: 18/452,632

(22) Filed: Aug. 21, 2023

Related U.S. Application Data

(60) Provisional application No. 63/400,526, filed on Aug. 24, 2022.

(51) Int. Cl.
    *G06F 21/00* (2013.01)
    *G06F 21/62* (2013.01)

(52) U.S. Cl.
    CPC .. *G06F 21/6227* (2013.01); *G06F 2221/2113* (2013.01); *G06F 2221/2141* (2013.01)

(58) Field of Classification Search
    None
    See application file for complete search history.

(56) References Cited

U.S. PATENT DOCUMENTS

| | | | |
|---|---|---|---|
| 5,987,440 A | 11/1999 | O'Neil | |
| 6,963,980 B1 * | 11/2005 | Mattsson | G06F 21/6227 713/193 |
| 7,289,971 B1 | 10/2007 | O'Neil | |
| 7,630,986 B1 | 12/2009 | Herz | |
| 8,195,569 B2 | 6/2012 | O'Neil | |
| 8,276,185 B2 * | 9/2012 | Messina | G06F 21/79 705/72 |
| 8,402,281 B2 * | 3/2013 | Dahl | H04L 9/088 705/51 |
| 8,433,726 B2 | 4/2013 | Swanburg | |
| 8,543,410 B2 | 9/2013 | Sinclair | |
| 8,788,819 B2 | 7/2014 | Broder | |
| 9,032,544 B2 | 5/2015 | Shelton | |
| 9,148,419 B2 | 9/2015 | D Souza | |
| 9,397,983 B2 | 7/2016 | Moffat | |
| 9,760,697 B1 | 9/2017 | Walker | |

(Continued)

FOREIGN PATENT DOCUMENTS

| | | |
|---|---|---|
| EP | 3861517 A1 | 8/2021 |
| KR | 20160072391 A | 6/2016 |

(Continued)

OTHER PUBLICATIONS

International Search Report and Written Opinion issued in App. No. PCT/US2023/072535, dated Nov. 28, 2023, 9 pages.

*Primary Examiner* — Maung T Lwin
(74) *Attorney, Agent, or Firm* — Blueshift IP, LLC; Robert Plotkin (57) ABSTRACT

A computer-implemented method and system: (A) read, from a plurality of data sources associated with a user, a plurality of data elements; (B) identify, for each of the plurality of data elements, a corresponding security level and a corresponding access level; (C) store, for each of the plurality of data elements, the corresponding security level and the corresponding access level; and (D) store, in a data store associated with the user, each of the plurality of data elements using a storage method specified by the data element's corresponding security level.

18 Claims, 2 Drawing Sheets

(56) References Cited

U.S. PATENT DOCUMENTS

| | | |
|---|---|---|
| 10,108,811 B1 | 10/2018 | Walker |
| 10,169,607 B1 | 1/2019 | Sheth |
| 10,339,333 B2* | 7/2019 | Shan ............... G06F 21/53 |
| 10,530,580 B1 | 1/2020 | Walker |
| 10,904,261 B2 | 1/2021 | Atanda |
| 10,909,264 B2 | 2/2021 | Yamaoka |
| 11,157,525 B2 | 10/2021 | Wilshinsky |
| 2002/0073066 A1 | 6/2002 | Coutts |
| 2002/0112167 A1* | 8/2002 | Boneh ............... H04L 67/02 713/182 |
| 2003/0097451 A1 | 5/2003 | Bjorksten |
| 2004/0143457 A1 | 7/2004 | Demirian |
| 2006/0004588 A1 | 1/2006 | Ananda |
| 2006/0041533 A1* | 2/2006 | Koyfman ............ G06F 16/22 |
| 2006/0229911 A1 | 10/2006 | Gropper |
| 2007/0006326 A1 | 1/2007 | Redlich |
| 2007/0055893 A1 | 3/2007 | Dodd |
| 2007/0079140 A1* | 4/2007 | Metzger ........... G06F 21/6245 713/189 |
| 2007/0198536 A1 | 8/2007 | Coutts |
| 2008/0151740 A1 | 6/2008 | Atzmon |
| 2010/0169672 A1* | 7/2010 | Takeda ............. H04L 9/0894 713/193 |
| 2010/0185871 A1 | 7/2010 | Scherrer |
| 2011/0258438 A1 | 10/2011 | Hildebrand |
| 2012/0203733 A1 | 8/2012 | Zhang |
| 2014/0032259 A1 | 1/2014 | Lafever |
| 2015/0356250 A1 | 12/2015 | Polimeni |
| 2020/0389317 A1* | 12/2020 | Dunjic ................ H04L 9/30 |
| 2020/0410116 A1 | 12/2020 | Williamson |
| 2021/0182915 A1 | 6/2021 | Blaikie, III |
| 2021/0256163 A1 | 8/2021 | Fleming |
| 2021/0342472 A1 | 11/2021 | Forman |
| 2022/0036377 A1 | 2/2022 | Seibel |
| 2022/0050921 A1 | 2/2022 | Lafever |

FOREIGN PATENT DOCUMENTS

| | | |
|---|---|---|
| KR | 20190029509 A | 3/2019 |
| WO | 0060435 | 10/2000 |
| WO | 2015009541 A1 | 1/2015 |
| WO | 2021237345 A1 | 12/2021 |

* cited by examiner

METHOD AND SYSTEM FOR PROVIDING CONTROL OVER STORAGE OF AND ACCESS TO USER DATA

CROSS-REFERENCE TO RELATED APPLICATIONS

This application claims the benefit of commonly-owned U.S. Prov. Pat. App. No. 63/400,526, filed on Aug. 24, 2022, entitled, "Method and System for Providing Controlled Access to User Data", which is hereby incorporated by reference herein.

BACKGROUND

Many risks and liabilities arise when companies store user data on their own databases. If these databases are compromised, and user data is leaked, companies may incur significant costs in fines and penalties, forensic and investigation activities, lost revenue from system downtime, and loss of potential customers, among many others. Individuals have limited control over their private data. Each company that stores an individual's data may have a different interface for data management. This leaves individuals with no platform to consolidate, sell, or use their own data. More generally, managing user data can be a risky, complex, and time consuming undertaking for both companies and individual users.

SUMMARY

A computer-implemented method and system: (A) read, from a plurality of data sources associated with a user, a plurality of data elements; (B) identify, for each of the plurality of data elements, a corresponding security level and a corresponding access level; (C) store, for each of the plurality of data elements, the corresponding security level and the corresponding access level; and (D) store, in a data store associated with the user, each of the plurality of data elements using a storage method specified by the data element's corresponding security level.

Other features and advantages of various aspects and embodiments of the present invention will become apparent from the following description and from the claims.

DETAILED DESCRIPTION

A computer-implemented method and system: (A) read, from a plurality of data sources associated with a user, a plurality of data elements; (B) identify, for each of the plurality of data elements, a corresponding security level and a corresponding access level; (C) store, for each of the plurality of data elements, the corresponding security level and the corresponding access level; and (D) store, in a data store associated with the user, each of the plurality of data elements using a storage method specified by the data element's corresponding security level.

Figure 1:
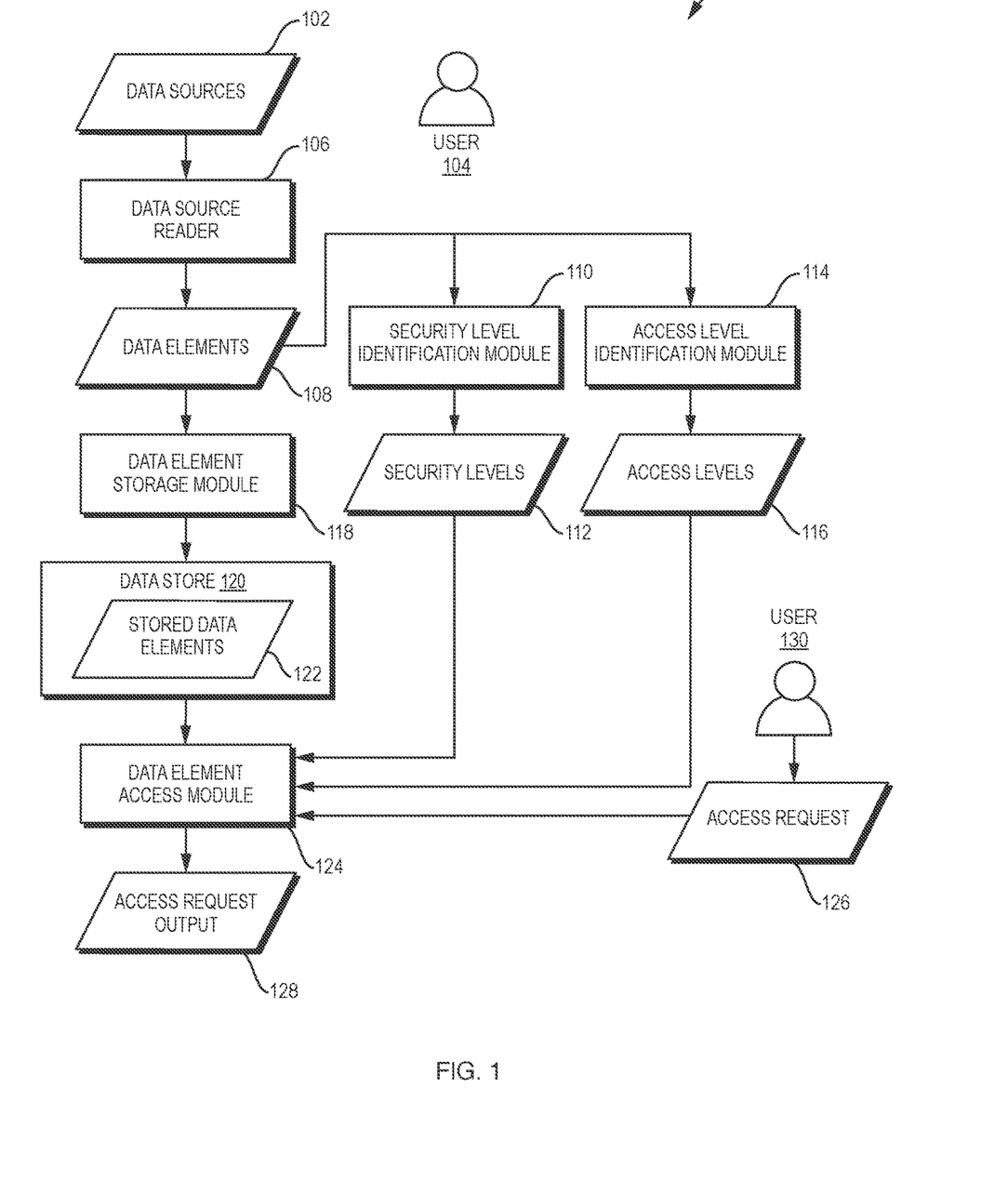
FIG. 1 is a dataflow diagram of a system for enabling control over storage of and access to user data according to one embodiment of the present invention.
Figure 2:
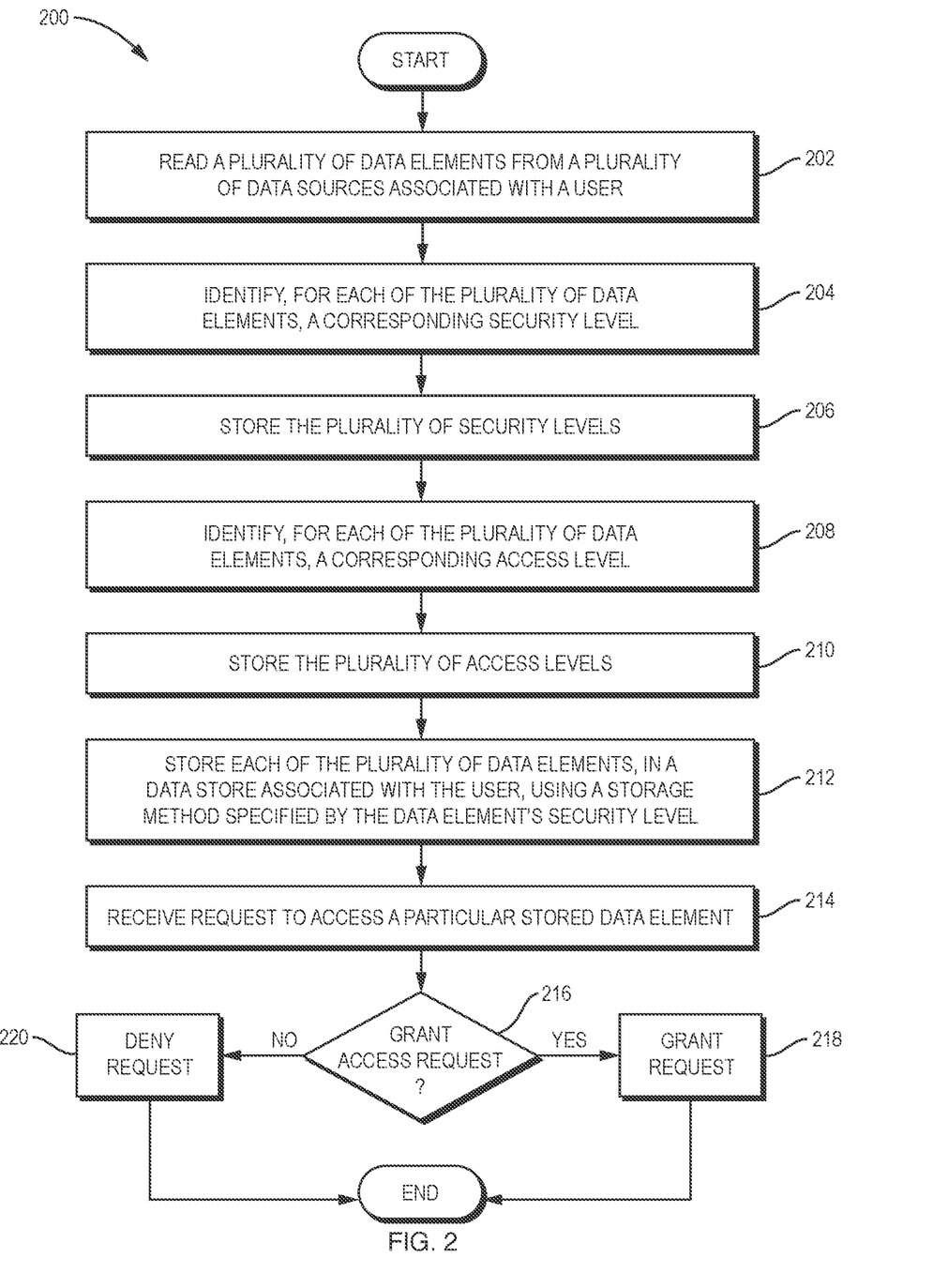
FIG. 2 is a flowchart of a method performed by the system according to one embodiment of the present invention.

Referring to FIG. 1, a dataflow diagram is shown of a system 100 for enabling control over storage of and access to user data according to one embodiment of the present invention. Referring to FIG. 2, a flowchart is shown of a method 200 performed by the system 100 according to one embodiment of the present invention.

The system 100 includes a user 104 and a plurality of data sources 102 associated with the user 104 (where n may be any number). The plurality of data sources 102 may include any kind(s) of data sources, in any combination. For example, any of the plurality of data sources 102 may be a database (e.g., an SQL or NoSQL database), a data warehouse, a directory service, a social media account, an email account, a file system, a software application, or any subset thereof, such as one or a plurality of records in a database, one or a plurality of emails in an email account, or one or a plurality of files/folders in a file system.

The user 104 may be associated with the plurality of data sources 102 in any of a variety of ways. For example, the user 104 may have login credentials (e.g., a username and password) that are associated with one of the plurality of data sources 102 and which provide the user 104 with access to that data source. As another example, metadata associated with the user 104 (e.g., a username or other identifier of the user 104) may be associated with one of the plurality of data sources 102, such as in the case where such metadata indicates that the user 104 is an owner of or otherwise has permission to access data in the data source. Embodiments of the present invention are not limited to any particular kind of association between the user 104 and the plurality of data sources 102.

The system 100 may determine that the user 104 is associated with each of the plurality of data sources 102 in any of a variety of ways. For example, a user of the system 100 (e.g., the user 104) may provide input indicating that the user 104 is associated with one or more of the plurality of data sources 102, and the system 100 may determine that the user 104 is associated with the specified data source(s) based on that input. As another example, the system 100 may include a variety of data identifying the user 104, such as any one or more of the following: a real name of the user 104, an email address of the user 104, a government identifier (e.g., Social Security Number) of the user 104, a telephone number of the user 104, a postal address of the user 104, and login credentials of the user 104 (e.g., a username and/or password). The system 100 may (e.g., when reading data from the plurality of data sources 102) use such data identifying the user 104 to determine whether the user 104 is associated with any particular one of the plurality of data sources 102. For example, the system 100 may compare such data identifying the user 104 with data in a user account profile in one of the plurality of data sources 102 and use the results of that comparison to determine whether the user 104 is associated with that data source. As another example, the system 100 may compare such data identifying the user 104 with one or more data elements in the one of the plurality of data sources 102 and use the results of that comparison to determine whether the user 104 is associated with that data source. The system 100 may, for example, use any kind of probabilistic matching to perform such comparisons to generate a probability that the user 104 is associated with any particular one of the plurality of data sources 102, and then determine that the user 104 is associated with that data source based on the probability, such as by determining that the user 104 is associated with that data source if the probability exceeds some predetermined threshold.

The plurality of data sources 102 may, for example, include any number and kind of data elements in any combination. Such data elements may, for example, include data elements of any data type(s), in any combination, such as binary, text, image, audio, and/or video data elements, in any combination. A data element in the plurality of data sources 102 may be a compound data element which includes a plurality of data elements of different data types (e.g., text and image). A data element in the data sources 102 may, for example, be a database or a subset thereof, such as a database table or a database record.

The system 100 also includes a data source reader 106, which reads, from the plurality of data sources 102 associated with the user 104, a plurality of data elements 108 (FIG. 2, operation 202). The plurality of data elements 108 that are read from the plurality of data sources 102 may, for example, include all or only a subset of the plurality of data elements in the plurality of data sources 102. The plurality of data elements 108 that are read from the plurality of data sources 102 may, for example, include data elements from two or more of the plurality of data sources 102, such as one or more data elements that are read from a first one of the plurality of data sources 102 (such as a first social media account associated with the user 104) and one or more data elements that are read from a second one of the plurality of data sources 102 (such as a second social media account associated with the user 104).

Reading the plurality of data elements 108 from the plurality of data sources 102 may include obtaining access to some or all of the plurality of data sources 102 on behalf of the user 104, such as by authenticating the data source reader 106 with some or all of the plurality of data sources 102 using credentials associated with the user 104. For example, using the data source reader 106 to read data from a first one of the plurality of data sources 102 associated with the user 104 may include authenticating the data source reader 106 with the first one of the plurality of data sources 102 using credentials associated with the user 104 and the first one of the plurality of data sources 102 (e.g., a username and password of the user 104 that are associated with an account of the user 104 at the first one of the plurality of data sources 102).

Reading the plurality of data elements 108 from the plurality of data sources 102 may include copying some or all of the plurality of data elements 108 from the plurality of data sources 102. As a result, the data sources 102 may retain the original data elements that were read by the data source reader 106, in which case the plurality of data elements 108 may be copies of such original data elements in the plurality of data sources 102. As another example, some or all of the plurality of data elements 108 may include references to the original data elements that were read by the data source reader 106. As another example, some or all of the plurality of data elements 108 may include both copies of, and references to, the original data elements that were read by the data source reader 106.

The system 100 also includes a security level identification module 110. The security level identification module 110 receives some or all of the plurality of data elements 108 as input and identifies (e.g., generates), for each of the plurality of data elements 108, a corresponding security level, thereby identifying a plurality of security levels 112 corresponding to some or all of the plurality of data elements 108 (FIG. 2, operation 204). The system 100 stores the plurality of security levels 112 (FIG. 2, operation 206).

The security level identification module 110 may identify a corresponding security level for any particular one of the plurality of data elements 108 in any of a variety of ways. For example, a user (e.g., the user 104) may provide input specifying a security level for a particular one (or plural subset of) the plurality of data elements 108, and the security level identification module 110 may use the security level specified by the user's input as the security level for the particular one (or plural subset of) the plurality of data elements 108. As another example, a security level model may be trained using any of a variety of machine learning techniques. Such a security level model may receive a data element as an input and provide one or more predictions of a security level as an output. The security level identification module 110 may use such a security level model to identify a corresponding security level for at least one of the plurality of data elements 108, such as by providing a particular one of the plurality of data elements 108 as an input to the security level model, receiving a predicted security level as output from the security level model, and identifying the predicted security level as the security level of the particular one of the plurality of data elements 108.

Different ones of the plurality of data elements 108 may be associated with the same or different ones of the plurality of security levels 112. For example, for any two data elements in the plurality of data elements 108:
  both of those data elements may be associated with a
    single one of the plurality of security levels 112; or
  a first one of those data elements may be associated with
    a first one of the plurality of security levels 112, and a
    second one of those data elements may be associated
    with a second, different, one of the plurality of security
    levels 112.

The system 100 also includes an access level identification module 114. The security level identification module 110 receives some or all of the plurality of data elements 108 as input and identifies (e.g., generates), for each of the plurality of data elements 108, a corresponding access level, thereby identifying a plurality of access levels 116 corresponding to some or all of the plurality of data elements 108 (FIG. 2, operation 208). The system 100 stores the plurality of access levels 116 (FIG. 2, operation 210).

The access level identification module 114 may identify a corresponding access level for any particular one of the plurality of data elements 108 in any of a variety of ways. For example, a user (e.g., the user 104) may provide input specifying an access level for a particular one (or plural subset of) the plurality of data elements 108, and the access level identification module 114 may use the access level specified by the user's input as the access level for the particular one (or plural subset of) the plurality of data elements 108. As another example, an access level model may be trained using any of a variety of machine learning techniques. Such an access level model may receive a data element as an input and provide one or more predictions of an access level as an output. The access level identification module 114 may use such an access level model to identify a corresponding access level for at least one of the plurality of data elements 108, such as by providing a particular one of the plurality of data elements 108 as an input to the access level model, receiving a predicted access level as output from the access level model, and identifying the predicted access level as the access level of the particular one of the plurality of data elements 108.

Different ones of the plurality of data elements 108 may be associated with the same or different ones of the plurality of access levels 116. For example, for any two data elements in the plurality of data elements 108:
  both of those data elements may be associated with a
    single one of the plurality of access levels 116; or
  a first one of those data elements may be associated with
    a first one of the plurality of access levels 116, and a second one of those data elements may be associated with a second, different, one of the plurality of access levels 116.

The description may use the terms "corresponding to" and "associated with" interchangeably herein to refer to the relationship between the data elements 108 and the security levels 112 and plurality of access levels 116. For example, as used herein:

"a data element's corresponding security level" and "the security level associated with a data element" have the same meaning;

"a security level's corresponding data element" and "the data element associated with a security level" have the same meaning;

"a data element's corresponding access level" and "the access level associated with a data element" have the same meaning; and "an access level's corresponding data element" and "the data element associated with an access level" have the same meaning.

Notwithstanding the above, a security level may be associated with one or more of the plurality of data elements 108, and an access level may be associated with one or more of the plurality of data elements 108. As a result, references herein to "the" data element associated with a security level or access level should be understood to refer to any one or more data elements associated with the security level or access level.

Associations between the plurality of data elements 108 and their corresponding security levels and access levels may be generated and/or stored in any of a variety of ways. For example, the system 100 may perform any one or more of the following:

When any one of the plurality of security levels 112 is identified (e.g., generated) in operation 204, the security level identification module 110 may store data (e.g., in the security level) that identifies the corresponding data element in the plurality of data elements 108.

When any one of the plurality of security levels 112 is identified (e.g., generated) in operation 204 for a particular one of the plurality of data elements 108, the security level identification module 110 may store data (e.g., in the particular one of the plurality of data elements 108) that identifies the identified security level.

When any one of the plurality of access levels 116 is identified (e.g., generated) in operation 208, the access level identification module 114 may store data (e.g., in the access level) that identifies the corresponding data element in the plurality of data elements 108.

When any one of the plurality of access levels 116 is identified (e.g., generated) in operation 208 for a particular one of the plurality of data elements 108, the access level identification module 114 may store data (e.g., in the particular one of the plurality of data elements 108) that identifies the identified access level.

The system 100 also includes a data element storage module 118, which stores each of some or all of the plurality of data elements 108, in a data store 120 associated with the user 104, using a storage method specified by the data element's corresponding security level (FIG. 2, operation 212). The resulting stored data elements are shown in FIG. 1 as stored data elements 122 within the data store 120. As implied by the description above, some or all of the stored data elements 122 may be copies of corresponding data elements that the data source reader 106 read from the plurality of data sources 102.

Because the plurality of data elements 108 may be read from the plurality of data sources 102, which may store data in a plurality of formats, the data element storage module 118 may convert some or all of the plurality of data elements 108 into a common data format and store the stored data elements 122 in that common data format in the data store 120. The common data format may, for example, be a relational database or one or more extensible JSON documents using the SCIM Core Schema standard.

Each of the plurality of security levels 112 may specify one or more corresponding security requirements. Different ones of the plurality of security levels 112 may specify different corresponding security requirements. If a particular data element is associated with a particular security level, the system 100 may require the security requirement(s) specified by the particular security level to be satisfied by an entity before the system 100 permits a request to store or modify the particular data element (e.g., a request to store the particular data element in the data store 120). For example, in operation 212, the data element storage module 118 may determine, for each of one or more of the plurality of data elements 108, whether that data element satisfies its corresponding security requirement(s) (as specified by the particular data element's corresponding security level), and only store that particular data element in the data store 120 if the data element storage module 118 determines that the particular data element satisfies its corresponding security requirement(s). As this implies, operation 212 may not store all of the data elements 108 in the data store 120, because at least some of the plurality of data elements 108 may not satisfy their corresponding security requirements.

The data element storage module 118 may use different storage methods to store different ones of the plurality of data elements 108 in the data store 120. For example, when storing a first one of the plurality of data elements 108 in the data store 120, the data element storage module 118 may: identify a first security level corresponding to the first one of the plurality of data elements 108; identify a first storage method associated with the first security level; and store the first one of the plurality of data elements 108 in the data store 120 using the first storage method. When storing a second one of the plurality of data elements 108 in the data store 120, the data element storage module 118 may: identify a second security level corresponding to the second one of the plurality of data elements 108; identify a second storage method associated with the second security level; and store the second one of the plurality of data elements 108 in the data store 120 using the second storage method. The first storage method may differ from the second storage method.

The system 100 may, in association with any one or more of the stored data elements 122, store one or both of the following: (1) data that identifies the user 104 associated with the stored data element; and (2) the data source (within the plurality of data sources 102) from which the stored data element was obtained (e.g., in operation 202). Such storing may, for example, be performed as part of the storing performed in operation 212. Such data identifying the user 104 associated with the stored data element may take any of a variety of forms, such as any of the kinds of user-identifying data disclosed herein (e.g., username). Such data identifying the data source of a stored data element in the stored data elements 122 may take any of a variety of forms, such as a URL of the data source, account identification data (e.g., username or another unique account identifier) identifying an account in the data source, a name (or other unique identifier) of a database table within the data source, a name (or other unique identifier) of a column within the data source, a filename within the data source, or a network path within the data source.

The plurality of security levels 112, plurality of access levels 116, and stored data elements 122 may be stored in any locations relative to each other. For example, the plurality of security levels 112, plurality of access levels 116, and stored data elements 122 may all be stored in the data store 120. As another example, the stored data elements 122 may be stored in the data store 120, while the plurality of security levels 112 and plurality of access levels 116 may not be stored in the data store 120.

As mentioned above, storing each of the plurality of data elements 108 in the data store 120 may include storing each such data element using a storage method specified by the data element's corresponding security level. Storing a data element using a storage method specified by a security level corresponding to particular one of the plurality of data elements 108 may include: identifying a corresponding security level for the particular one of the plurality of data elements 108 (such as by using any of the data disclosed herein); identifying an encryption method specified by the corresponding security level for the particular one of the plurality of data elements 108; encrypting the particular one of the plurality of data elements 108 using the encryption method associated with the particular one of the plurality of data elements 108 to produce an encrypted data element; and storing the encrypted data element in the data store 120 associated with the user 104.

Different ones of the plurality of security levels 112 may specify different encryption methods. As this implies, a first one of the plurality of data elements 108 may be associated with a first one of the plurality of security levels 112, which may specify a first encryption method, and a second one of the plurality of data elements 108 may be associated with a second one of the plurality of security levels 112, which may specify a second encryption method, where the first encryption method may differ from the second encryption method. As this implies, storing the first and second ones of the plurality of data elements 108 in the data store 120 in operation 212 may include: encrypting the first one of the plurality of data elements 108 using the first encryption method and storing the resulting first encrypted data element in the data store 120; and encrypting the second one of the plurality of data elements 108 using the second encryption method and storing the resulting second encrypted data element in the data store 120. In this example, two different encryption methods, specified by two different security levels, are used to encrypt two different data elements, thereby producing two different encrypted data elements, which are stored in the data store 120.

A single one of the security levels 112 may specify a plurality of encryption methods (e.g., a plurality of encryption algorithms and/or a plurality of encryption keys). As this implies, if a particular one of the plurality of data elements 108 is associated with a security level that is associated with a plurality of encryption methods, then storing that particular one of the plurality of data elements 108 in the data store 120 in operation 212 may include encrypting the particular one of the plurality of data elements 108 using a first encryption method associated with the security level to produce a first encrypted data element, encrypting the first encrypted data element using the second encryption method associated with the security level to produce a second encrypted data element, and storing the second encrypted data element in the data store 120. More generally, such a technique may be applied to any number of encryption methods associated with a particular security level.

The term "encryption method," as used herein, may for example, refer to an encryption algorithm or a cryptographic key. For example, a first encryption method specified by a first one of the plurality of security levels 112 may include a first encryption algorithm, and a second encryption method specified by a second one of the plurality of security levels 112 may include a second encryption algorithm, where the first encryption algorithm differs from the second encryption algorithm. As another example, a first encryption method specified by a first one of the plurality of security levels 112 may include a first cryptographic key, and a second encryption method specified by a second one of the plurality of security levels 112 may include a second cryptographic key, where the first cryptographic key differs from the second cryptographic key.

As another example, storing a data element using a storage method specified by a security level corresponding to particular one of the plurality of data elements 108 may include: identifying a corresponding security level for the particular one of the plurality of data elements 108 (such as by using any of the data disclosed herein); identifying a storage location specified by the corresponding security level for the particular one of the plurality of data elements 108; and storing the particular one of the plurality of data elements 108 in the storage location specified by the corresponding security level for the particular one of the plurality of data elements 108. Examples of different storage locations include different accounts, different file systems, and different file system paths/folders. A storage method may, for example, split up a single data element into a plurality of byte sequences and store the plurality of byte sequences in a plurality of locations (e.g., one byte sequence in one location and another byte sequence in a different location) to prevent the data element from being compromised when any one of the plurality of locations is compromised.

The system 100 may, for example: identify a corresponding security level for a particular one of the plurality of data elements 108 (such as by using any of the data disclosed herein); identify a transfer process specified by the corresponding security level for the particular one of the plurality of data elements 108; and transfer the particular one of the plurality of data elements 108 from a first location to a second location using the transfer process specified by the corresponding security level for the particular one of the plurality of data elements 108. The system 100 may use any of a variety of transfer processes to transfer a data element from a first location to a second location. For example, the system 100 may transfer a data element in encrypted form over an unencrypted connection. As another example, the system 100 may transfer a data element using a secure end-to-end connection using, for example, Secure Sockets Layer (SSL), Kerberos, or a Virtual Private Network (VPN).

The system 100 may, for example: identify a corresponding security level for a particular one of the plurality of data elements 108 (such as by using any of the data disclosed herein); identifying a processing method specified by the corresponding security level for the particular one of the plurality of data elements 108; and process the particular one of the plurality of data elements 108 using the processing method specified by the corresponding security level for the particular one of the plurality of data elements 108. Such a processing method may, for example, be applied to a data element while the data element is in use, e.g., in use by a software application. For example, such a processing method may obfuscate the visual display of a data element on a screen. As another example, such a processing method may execute in a trusted execution environment (e.g., a CPU enclave or a virtual CPU) that executes code only in an encrypted area of memory, and may process one or more of the plurality of data elements 108 in that trusted execution environment.

The system 100 may enforce a minimum security level for any set of data, such as some or all of the data elements in the plurality of data sources 102 or some or all of the data in the plurality of data elements 108. The system 100 may enforce different minimum security levels for different sets of data. For example, the system 100 may enforce a first minimum security level for a first set of data associated with a first user and enforce a second minimum security level for a second set of data associated with a second user. As another example, the system 100 may enforce a first minimum security level for a first set of data associated with a first one of the plurality of data sources 102 and enforce a second minimum security level for a second set of data associated with a second one of the plurality of data sources 102.

The system 100 may enforce minimum security levels in any of a variety of ways. For example, identifying the security level that corresponds to any particular one of the plurality of data elements 108 in operation 204 may include: identifying a minimum security level associated with the particular data element; identifying a security level requested (e.g., by the user 104 or the security level model) to be associated with the data element; determining whether the minimum security level associated with the particular data element is greater than the requested security level; if the minimum security level is determined to be greater than the requested security level, then associating the minimum security level with the particular data element; and, otherwise (e.g., If the minimum security level is not determined to be greater than the requested security level), associating the requested security level with the particular data element.

The system 100 may enforce a minimum access level for any set of data, such as some or all of the data elements in the plurality of data sources 102 or some or all of the data in the plurality of data elements 108. The system 100 may enforce different minimum access levels for different sets of data. For example, the system 100 may enforce a first minimum access level for a first set of data associated with a first user and enforce a second minimum access level for a second set of data associated with a second user. As another example, the system 100 may enforce a first minimum access level for a first set of data associated with a first one of the plurality of data sources 102 and enforce a second minimum access level for a second set of data associated with a second one of the plurality of data sources 102.

The system 100 may enforce minimum access levels in any of a variety of ways. For example, identifying the access level that corresponds to any particular one of the plurality of data elements 108 in operation 208 may include: identifying a minimum access level associated with the particular data element; identifying a access level requested (e.g., by the user 104 or the access level model) to be associated with the data element; determining whether the minimum access level associated with the particular data element is greater than the requested access level; if the minimum access level is determined to be greater than the requested access level, then associating the minimum access level with the particular data element; and, otherwise (e.g., If the minimum access level is not determined to be greater than the requested access level), associating the requested access level with the particular data element.

The system 100 may enforce a default security level for any set of data, such as some or all of the data elements in the plurality of data sources 102 or some or all of the data in the plurality of data elements 108. The system 100 may enforce different default security levels for different sets of data. For example, the system 100 may enforce a first default security level for a first set of data associated with a first user and enforce a second default security level for a second set of data associated with a second user. As another example, the system 100 may enforce a first default security level for a first set of data associated with a first one of the plurality of data sources 102 and enforce a second default security level for a second set of data associated with a second one of the plurality of data sources 102.

The system 100 may enforce default security levels in any of a variety of ways. For example, associating a security level with any particular one of the plurality of data elements 108 may include: identifying a default security level associated with the particular one of the plurality of data elements 108; determining whether an override security level has been specified for the particular one of the plurality of data elements 108; if no override security level has been specified for the particular one of the plurality of data elements 108, then associating the default security level with the particular one of the plurality of data elements 108; otherwise, associating the override security level with the particular one of the plurality of data elements 108. An override security level may be specified in any of a variety of ways, such as by receiving such an override security level in input from the user 104 or from the security level model in connection with one or more of the plurality of data elements 108.

The system 100 may enforce a default access level for any set of data, such as some or all of the data elements in the plurality of data sources 102 or some or all of the data in the plurality of data elements 108. The system 100 may enforce different default access levels for different sets of data. For example, the system 100 may enforce a first default access level for a first set of data associated with a first user and enforce a second default access level for a second set of data associated with a second user. As another example, the system 100 may enforce a first default access level for a first set of data associated with a first one of the plurality of data sources 102 and enforce a second default access level for a second set of data associated with a second one of the plurality of data sources 102.

The system 100 may enforce default access levels in any of a variety of ways. For example, associating an access level with any particular one of the plurality of data elements 108 may include: identifying a default access level associated with the particular one of the plurality of data elements 108; determining whether an override access level has been specified for the particular one of the plurality of data elements 108; if no override access level has been specified for the particular one of the plurality of data elements 108, then associating the default access level with the particular one of the plurality of data elements 108; otherwise, associating the override access level with the particular one of the plurality of data elements 108. An override access level may be specified in any of a variety of ways, such as by receiving such an override access level in input from the user 104 or from the access level model in connection with one or more of the plurality of data elements 108.

As implied by the description above, any of the plurality of data elements 108 may be associated with more than one of the plurality of security levels 112 at the same time and/or with more than one the plurality of access levels 116 at the same time. For example, a data element in the plurality of data elements 108 may be associated with a first one of the plurality of security levels 112 in connection with a first data consumer, and the same data element may be associated with a second one of the plurality of security levels 112 in connection with a second data consumer. When a request is made to store or modify the data element in the data store 120, the data element storage module 118 may identify the requesting user, identify the security level associated with the data element in connection with the requesting user and then process the storage/modification request based on the identified security level using any of the techniques disclosed herein.

Similarly, a data element in the plurality of data elements 108 may be associated with a first one of the plurality of access levels 116 in connection with a first data consumer, and the same data element may be associated with a second one of the plurality of access levels 116 in connection with a second data consumer. When a request is made to access the data element in the data store 120, the data element access module 124 may identify the requesting user, identify the access level associated with the data element in connection with the requesting user and then process the access request based on the identified access level using any of the techniques disclosed herein.

Any particular one of the plurality of security levels 112 may be associated with a plurality of data elements in the stored data elements 122. Similarly, any particular one of the access level identification module 114 may be associated with a plurality of data elements in the stored data elements 122. In other words, a security level may be shared among a plurality of data elements, and an access level may be shared among a plurality of data elements. This is even true across a plurality of users. For example, any particular one of the security levels 112 may be associated with one or more data elements in the user 104's data store 120, and may be associated with one or more data elements in another user's data store (not shown). Similarly, any particular one of the plurality of access levels 116 may be associated with one or more data elements in the user 104's data store 120, and may be associated with one or more data elements in another user's data store (not shown).

Some or all of the plurality of security levels 112 may be ordered (ranked) in any of a variety of ways. For example, the plurality of security levels 112 may include a "low," "medium," and "high" security level, where the medium security level is ranked higher than the low security level, and where the high security level is ranked higher than the medium security level. Each such security level may be associated with distinct security requirements, such that higher-ranked security levels are associated with more demanding security requirements than lower-ranked security levels. Similarly, the plurality of access levels 116 may include a "low," "medium," and "high" access level, where the medium access level is ranked higher than the low access level, and where the high access level is ranked higher than the medium access level. Each such access level may be associated with distinct access requirements, such that higher-ranked access levels are associated with more demanding access requirements than lower-ranked access levels.

The system 100 may also include a data element access module 124, which may be used to access the stored data elements 122 in any of a variety of ways in accordance with the plurality of access levels 116 associated with the stored data elements 122. For example, the data element access module 124 may receive an access request 126 (e.g., from a requesting user 130) to access a particular one of the stored data elements 122 (FIG. 2, operation 214). Note that the requesting user 130 may or may not be the same as the user 104 with whom the data store 120 is associated. For example, the requesting user 130 may be a user who is different from the user 104 with whom the data store 120 is associated, and who seeks access to the stored data elements 122 associated with the user 104. More generally, the source of the access request 126 may or may not be a human. For example, the source of the access request 126 may be a computer program, which may provide the access request 126 in any of a variety of ways, such as via an API. As a result, any reference herein to the requesting user 130 should be understood to refer to any source of the access request 126, whether or not human.

The data element access module 124 may determine whether the access request 126 should be granted based on the corresponding access level for the particular data element (FIG. 2, operation 216). For example, the data element access module 124 may identify the access level (within the plurality of access levels 116) corresponding to the particular data element, such as by using any of the data disclosed herein, and use the identified access level to determine whether the access request 126 should be granted.

If the data element access module 124 determines (in operation 216) that the access request 126 should be granted, then, in response to that determination, the data element access module 124 grants the access request 126 (FIG. 2, operation 218). If the data element access module 124 determines (in operation 216) that the access request 126 should not be granted (or does not determine that the access request 126 should be granted), then, in response to that determination, the data element access module 124 does not grant (e.g., denies) the access request 126 (FIG. 2, operation 220).

The data element access module 124 may determine whether the access request 126 should be granted in any of a variety of ways. For example, such a determination may include: identifying an access requirement specified by the corresponding access level for the particular data element; determining whether the access request 126 satisfies the access requirement; if the access request 126 is determined to satisfy the access requirement, then, in response to that determination, granting the access request 126; otherwise, denying the access request 126. Determining whether the access request 126 satisfies the access requirement may include determining whether data received in connection with the access request 126 satisfies the access requirement. Various examples of such data are described below.

The access requirement may include a single access requirement or a plurality of component access requirements. If the access requirement includes a plurality of component access requirements, then determining whether the access request 126 satisfies the access requirement may include determining whether the access request 126 satisfies some or all of the plurality of component access requirements, and applying a function (e.g., a logical AND or OR) to the outcomes of such determinations in connection with the plurality of component access requirements in order to determine whether the access request 126 satisfies the access requirement. As one example, if the access requirement includes a first component access requirement and a second component requirement, then the data element access module 124 may determine whether the first component access requirement has been satisfied; determine whether the second component access requirement has been satisfied; and determine that the access requirement has been satisfied if and only if the first component access requirement has been determined to be satisfied and the second component access requirement has been determined to be satisfied.

Embodiments of the present invention may enable a determination by the data element access module 124 that the access request 126 should be denied to be overridden, e.g., by the user 104 associated with the data store 120. For example, operation 216 may include determining whether to grant the access request 126 in any of the ways disclosed herein and, if the data element access module 124 determines that the access request 126 should be denied, the data element access module 124 may prompt the user 104 to grant or deny the access request 126. If the user 104 provides, in response to such a prompt, input indicating that the access request 126 should be granted then the data element access module 124 may, in response to such user input, grant the access request 126, despite the data element access module 124's initial determination that the access request 126 should be denied. If, instead, the user 104 input indicates that the access request 126 should be denied, then the data element access module 124 may deny the access request 126. In such embodiments, the data element access module 124 may or may not seek the user 104's confirmation of a determination by the data element access module 124 that the access request 126 should be granted.

The data element access module 124 may, as a result of determining whether to grant the access request 126 in operation 216, generate access request output 128. The access request output 128 may take any of a variety of forms. For example, the access request output 128 may contain data indicating whether the data element access module 124 granted the access request 126 (e.g., a binary value of TRUE or FALSE). As another example, if the data element access module 124 determines that the access request 126 should be granted, then the access request output 128 may include one or more of the stored data elements 122 which were requested by the access request 126. The data element access module 124 may, for example, provide the access request output 128 to the source of the access request 126, such as the requesting user 130.

As another example, granting the access request 126 may include granting, to the source of the access request 126 (e.g., the requesting user 130), access to an application program interface (API) for accessing the particular data element(s) requested by the access request 126. The access request output 128 may include data which grants such access. As a result, the recipient of the access request output 128 (e.g., the requesting user 130) may use the API to access the particular data element(s) requested by the access request 126.

As another example, granting the access request 126 may include providing a cryptographic key for decrypting the particular data element(s) requested by the access request 126 to the source of the access request 126 (e.g., the requesting user 130), or otherwise sharing such a cryptographic key with the source of the access request 126. The access request output 128 may, for example, include such a cryptographic key or information for accessing such a cryptographic key. As a result, the recipient of the access request output 128 (e.g., the requesting user 130) may use the cryptographic key to decrypt the particular data element(s) requested by the access request 126.

Determining whether the access request 126 satisfies the access requirement may include: identifying information associated with a requestor from which the access request 126 was received (e.g., the requesting user 130); and determining whether the information associated with the requestor satisfies the access requirement. The information associated with the requestor may, for example, be received from the requestor. Determining whether the information associated with the requestor satisfies the access requirement may, for example, include determining whether the information associated with the requestor authenticates an identity of the requestor.

The access requirement may include one or more temporal requirements. For example, the access requirement may only allow the access request 126 to be granted within one or more windows of time specified by the access requirement, such as a window of time having a particular duration and/or starting at a particular point in time (e.g., for one week starting on Jan. 1, 2023). Determining whether the access request 126 satisfies the access requirement may, for example, include: identifying a time associated with the access request 126 (e.g., a time at which the access request 126 was created by the requestor or received by the data element access module 124); and determining whether the time associated with the access request 126 satisfies the access requirement.

Just as the data element access module 124 may receive the access request 126, the data element storage module 118 may receive a storage/modification request (not shown) at any time, such as after the data elements 108 have been stored in the data store 120. Such a storage/modification request may be received from a requestor (e.g., the user 130) and may request that a particular data element be stored in the data store 120, or that a particular modification be made to a particular data element that is already stored in the data store 120. In response to receiving such a storage/modification request, the data element storage module 118 may perform any of the operations described herein in connection with storing a data element in the data store 120 in method 200. For example, the data element storage module 118 may:

identify a security level associated with the particular data element specified by the storage/modification request, using any of the techniques disclosed herein;

determine whether the storage/modification request satisfies the security requirement(s) associated with the security level using any of the techniques disclosed herein; and     only grant the storage/modification request if the storage/modification request satisfies the security requirement(s) associated with the security level.

If the data element storage module 118 grants the storage/modification request, then the system 100 may perform any one or more of the following:

identify a security level associated with the particular data element, such as in any of the ways disclosed herein in connection with operation 204;

store the identified security level (e.g., in the plurality of security levels 112), such as in any of the ways disclosed herein in connection with operation 206;

identify an access level associated with the particular data element, such as in any of the ways disclosed herein in connection with operation 208;

store the identified access level (e.g., in the plurality of access levels 116), such as in any of the ways disclosed herein in connection with operation 210; and store the particular data element specified by the storage/modification request (e.g., in the data store 120), such as in any of the ways disclosed in connection with operation 212.

Although the description above refers to storing additional data elements in the data store 120, similar techniques may be used to process requests to modify existing data elements in the data store 120. When such a modification request is granted, the system 100 may perform the modification requested by the modification request, such as changing the contents of a data element in the data store 120, changing the security level associated with a data element in the data store 120, and/or changing the access level associated with a data element in the data store 120. The system 100 may enable one or more of the stored data elements 122 to be shared with one or more users other than the user 104 associated with the data store 120 (e.g., the requesting user 130). Data specifying the user(s) with whom any particular data element is shared may be stored in the system 100, such as in the data store 120. The user 104 may provide input to the system 100 specifying the user(s) with whom any particular one of the stored data elements 122 is shared.

The system 100 may implement such sharing of data elements in any of a variety of ways. For example, determining whether the access request 126 satisfies the access requirement may include: identifying a requester (e.g., the requesting user 130) associated with the access request 126; determining whether the particular data element has been shared with the requester; if the particular data element has not been shared with the requester, then denying the access request 126; and, if the particular data element has been shared with the requester, then using any of the techniques disclosed herein to grant the requester with access to the particular data element only if the access request 126 satisfies the requirement(s) of the access level associated with the particular data element. For example, if the particular data element has been shared with the requester, then the data element access module 124 may: identify a requirement specified by the corresponding access level for the particular data element; determine whether the access request 126 satisfies the requirement; if the access request 126 is determined to satisfy the requirement, then granting the access request 126; otherwise, denying the access request 126.

As disclosed herein, the system 100 may include the plurality of security levels 112 and the plurality of access levels 116. At least some of the plurality of security levels 112 and at least some of the plurality of access levels 116 may have certain requirements in common with each other. For example, a particular one of the plurality of security levels 112 and a particular one of the plurality of access levels 116 may both require that a user authenticate the user's identity using a passport. In the case of the plurality of security levels 112, such authentication may be required for the user 104 to store a data element in the data store 120. In the case of the plurality of access levels 116, such authentication may be required for the requesting user 130 to access a data element in the data store 120. This is an example in which one of the plurality of security levels 112 has a requirement that is the same as a requirement of one of the plurality of access levels 116. Such a security level and such an access level may both be associated with a particular one of the stored data elements 122. In this example, a data element within the stored data elements 122 is associated with a security level (within the plurality of security levels 112) and with an access level (within the plurality of access levels 116), where the security level and the access level have a requirement in common.

The requirements associated with the plurality of security levels 112 may, however, differ from the requirements associated with the plurality of access levels 116 in a variety of ways. At least some of the plurality of security levels 112 and at least some of the plurality of access levels 116 may have certain requirements that differ from each other. For example, a particular one of the plurality of security levels 112 may have an associated security requirement (e.g., a storage requirement), and a particular one of the plurality of access levels 116 may have an associated access requirement, where the security requirement may differ from the access requirement. An example of such a difference is that the security requirement may be satisfied by data that differ from data that satisfy the access requirement. Such a security level and such an access level may both be associated with a particular one of the stored data elements 122. In this example, a data element within the stored data elements 122 is associated with a security level (within the plurality of security levels 112) and with an access level (within the plurality of access levels 116), where the security level has at least one requirement that differs from at least one requirement of the access level.

Similarly, the access requirements associated with any two of the stored data elements 122 may be the same as, or differ from, each other. As this implies, identifying the access levels associated with the stored data elements 122 in operation 208 may include: identifying a first corresponding access level for a first one of the plurality of data elements; and identifying a second corresponding access level for a second one of the plurality of data elements; wherein the first corresponding access level differs from the second corresponding access level. The first and second corresponding access levels may differ from each other, for example, in their associated access requirements. As this implies, the data element storage module 118 may, for example, store at least two of the plurality of data elements 108 in the data store 120 having at least two different associated access requirements. As this also implies, the plurality of access levels 116 may include at least one access level that has an access requirement that differs from an access requirement of at least one other access level in the plurality of access levels 116.

Similarly, the security requirements associated with any two of the stored data elements 122 may be the same as, or differ from, each other. As this implies, identifying the security levels associated with the stored data elements 122 in operation 204 may include: identifying a first corresponding security level for a first one of the plurality of data elements; and identifying a second corresponding security level for a second one of the plurality of data elements; wherein the first corresponding security level differs from the second corresponding security level. The first and second corresponding security levels may differ from each other, for example, in their associated storage methods and/or encryption methods. As this implies, the data element storage module 118 may, for example, store at least two of the plurality of data elements 108 in the data store 120 using at least two different storage methods. Similarly, the data element storage module 118 may, for example, encrypt at least two of the plurality of data elements 108 for storage in the data store 120 using at least two different encryption methods. As this also implies, the plurality of security levels 112 may include at least one security level that has a storage requirement that differs from a storage requirement of at least one other storage level in the plurality of security levels 112.

More generally, both security requirements and access requirements are examples of "requirements," as that term is used herein. Any access requirement disclosed herein may also be used as an access requirement. Any security requirement disclosed herein may also be used as an access requirement. Any requirement disclosed herein which is not designated as a security requirement or an access requirement may be used as a security requirement and/or an access requirement.

Any requirement (e.g., a security requirement or an access requirement) may require that data be validated in order to satisfy the requirement. For example, a requirement may require that data associated with the user 104 (such as the user's name, address, telephone number, or government identifier) be validated in order for the requirement to be satisfied. As another example, a requirement may require that a document associated with the user 104 (e.g., a passport, driver's license, or other government identification document) be validated in order for the requirement to be satisfied. As this implies, a requirement may both require that certain data be received (e.g., from the user 104) and that the data be validated in order for the requirement to be satisfied. The system 100 may use any of a variety of methods, including any of a variety of known methods, to perform such validation, such as any one or more of the following in any combination: document verification (e.g., comparing a document received from the user 104 against known valid examples of such a document), scanning a code (e.g., a barcode or QR code) in a document received from the user 104 and validating the scanned code, cross-referencing data in a document received from the user with one or more trusted sources of such data, performing biometric verification on the user 104, and using one or more third-party authentication services to validate data received from the user 104. Such validation may, for example, be performed using data in the data store 120 and/or data outside of the data store 120.

The system 100 may, for example, intercept requests to access data elements that are stored in other systems (e.g., applications), and apply such requests to the data store 120, such as in any of the ways disclosed herein (e.g., in connection with operations 214-220). For example, the data element access module 124 may process such an intercepted request in any of the ways disclosed herein in connection with processing the access request 126. Similarly, the system 100 may, for example, intercept requests to store and/or modify data elements in other systems, and apply such requests to the data store 120, such as in any of the ways disclosed herein in connection with requests to store/modify data in the data store 120 (e.g., in connection with operations 204-212). Such other systems may, for example, be any of the kinds of systems disclosed herein as examples of the plurality of data sources 102, such as databases, social media accounts, email accounts, file systems, and software applications. The system 100 may intercept such requests without requiring the hardware and/or software systems that send such requests to be reprogrammed, reconfigured, or redeployed.

The component shown in FIG. 1 as the data source reader 106 may perform such interceptions and subsequent processing, for requests to store, modify, and/or access data. As a result, although the data source reader 106 is labeled as a "reader" in FIG. 1, in practice the data source reader 106 may intercept and process read (access) requests, write (storage/modification) requests, or both. For example, when a requestor (e.g., the requesting user 130) provides a request to store or access (e.g., read) data in an existing system (e.g., one of the plurality of data sources 102), the system 100 (e.g., the data source reader 106) may intercept such a request and process the intercepted request in any of the ways disclosed herein. The requestor may provide the request in the manner normally specified by the target system, e.g., an API call to one of the plurality of data sources 102. The system 100 (e.g., the data source reader 106) may intercept and process such a request, including providing output (e.g., the requested data from the data store 120) to the requestor, without requiring the requestor to modify the manner in which the request is made.

The system 100 (e.g., the data source reader 106) may be provided with the ability to perform such interception of requests in any of a variety of ways. For example, before receiving a request to a particular system (e.g., software application), the system 100 may instrument code of the particular system (also referred to as "bytecode instrumentation") to enable requests addressed to the particular system to be intercepted, thereby generating instrumented code. Such instrumented code may execute on the particular system to perform any of the operations disclosed herein, including intercepting and processing requests to read, write, and/or modify data in the data store 120.

Any operation that is disclosed herein as being performed in connection with a single data element, such as a request to store, modify, or access a data element in the data store 120, may be applied to a plurality of data elements using the techniques disclosed herein. For example, any request made in connection with a plurality of data elements (e.g., a request to store, modify, or access a plurality of data elements) may be processed by performing, on each of the plurality of data elements, any of the operations that are disclosed herein as being performed on a single data element. As another example, any request made in connection with a plurality of data elements (e.g., a request to store, modify, or access a plurality of data elements) may be processed by performing, on the plurality of data elements, any of the operations that are disclosed herein as being performed on a single data element. As this implies, a single security level and/or access level may be associated with a plurality of data elements.

The system 100 may derive one or more data elements from one or more of the stored data elements 122 and store such derived data elements in the stored data elements 122. For example, the system 100 may derive a data element from: a single one of the stored data elements 122; a plurality of the stored data elements 122; a single one of the stored data elements 122 and data outside of the stored data elements 122; or a plurality of the stored data elements 122 and data outside of the stored data elements 122.

The security level that is associated with any particular derived data element in the stored data elements 122 may be the same as, or differ from, the security level that is associated with any of the data elements in the stored data elements 122 from which the particular derived data element was derived. The access level that is associated with any particular derived data element in the stored data elements 122 may be the same as, or differ from, the access level that is associated with any of the data elements in the stored data elements 122 from which the particular derived data element was derived.

Any of the techniques that are disclosed herein in connection with the stored data elements 122 (such as identifying and associating security levels and access levels to the stored data elements 122, and applying security levels and access levels to storing and accessing the stored data elements 122) are applicable to such derived data elements.

Although various components of the system 100 are shown as distinct components in FIG. 1 for ease of illustration, this is not a limitation of the present invention. In practice, various components may be combined with each other. For example:

- any combination of some or all of the data source reader 106, the data element access module 124, and the data element storage module 118 may be combined into a single module;
- the plurality of security levels 112 and the plurality of access levels 116 may be stored in a single data store; and
- the plurality of security levels 112 and the plurality of access levels 116 may be stored in the data store 120.

Various components of the system 100 may be replicated. For example, various components of the system 100 may be replicated into a plurality of instances of the component on a plurality of computers, such that each instance may perform the functions disclosed herein on the computer on which it resides. Examples of such components include the data source reader 106, the security level identification module 110, the access level identification module 114, the data element storage module 118, and the data element access module 124.

Various components of the system 100 may be implemented on different computers than each other. As one example, the data element access module 124 may be implemented using a client-side component (executing on a client computer) and a server-side component (executing on a server computer). The client-side component may receive the access request 126 from the requesting user 130 and transmit the access request 126 (or a request derived from the access request 126) to the server-side component, which may perform any of the operations disclosed herein in connection with processing a request to store, modify, or access data in the data store 120. The server-side component may provide any results of such an operation (e.g., data read from the data store 120) to the client-side component.

Although various operations (e.g., the operations 202-220 in the method 200 of FIG. 2) are disclosed herein in a particular order, such operations are not limited to being performed in such an order. Instead, such operations may be performed in any appropriate order to perform the functions disclosed herein. For example, some or all of the operations 202-220 may be performed on a first one of the plurality of data elements 108, and then performed on a second one of the plurality of data elements 108. Instances of the operations 202-220 for different ones of the plurality of data elements 108 may be intertwined with each other in various ways. As merely one example, a first one of the plurality of data elements 108 may be read from a first one of the plurality of data sources 102; then a second one of the plurality of data elements 108 may be read from a second one of the plurality of data sources 102; then the security level identification module 110 may identify a security level corresponding to the first one of the plurality of data elements 108; then the security level identification module 110 may identify a security level corresponding to the second one of the plurality of data elements 108. As this simple example illustrates, various components of the system 100 may operate in parallel with each other on various ones of the plurality of data elements 108 to perform multiple instances of the operations disclosed herein in any order.

Furthermore, some or all of the operations of the method 200 may be performed repeatedly over time, whether automatically (e.g., on a schedule and/or in response to changes in the plurality of data sources 102) and/or manually (e.g., in response to an instruction from a user). As a result, for example, the system 100 may:

- update the plurality of security levels 112 over time, such as in response to additional user input and/or updated training of the security level model based on additional training data received by the system 100;
- update the plurality of access levels 116 over time, such as in response to additional user input and/or updated training of the access level model based on additional training data received by the system 100;
- read additional data elements from the data sources 102 over time, including new data elements (and even new data sources) that did not exist in the data sources 102 when the method 200 was first performed, and perform some or all of the operations 202-220 of the method 200 on such additional data elements, thereby updating the data store 120 over time based on updates to the plurality of data sources 102 and the current state of the plurality of security levels 112 and the plurality of access levels 116; and
- receive additional access requests over time and apply those access requests to the current state of the data store 120, the plurality of security levels 112, and the plurality of access levels 116, in the manner disclosed herein in connection with processing the access request 126.

Although only a single data store 120, associated with the single user 104, is shown in FIG. 1 for ease of illustration, this is not a limitation of the present invention. The system 100 may include a plurality of data stores, each of which may be associated with a distinct user, and each of which may have any of the properties disclosed herein in connection with the data store 120. As this implies, the system 100 may create, update, and process access requests to a plurality of data stores containing data elements associated with a plurality of distinct users. Each such data store may have its own security levels and access levels, which may have any of the properties disclosed herein in connection with the plurality of security levels 112 and the plurality of access levels 116, respectively. The security levels of one data store may be the same as or differ from the security levels of another data store in any way. Similarly, the access levels of one data store may be the same as or differ from the access levels of another data store in any way.

It is to be understood that although the invention has been described above in terms of particular embodiments, the foregoing embodiments are provided as illustrative only, and do not limit or define the scope of the invention. Various other embodiments, including but not limited to the following, are also within the scope of the claims. For example, elements and components described herein may be further divided into additional components or joined together to form fewer components for performing the same functions.

Any of the functions disclosed herein may be implemented using means for performing those functions. Such means include, but are not limited to, any of the components disclosed herein, such as the computer-related components described below.

The techniques described above may be implemented, for example, in hardware, one or more computer programs tangibly stored on one or more computer-readable media, firmware, or any combination thereof. The techniques described above may be implemented in one or more computer programs executing on (or executable by) a programmable computer including any combination of any number of the following: a processor, a storage medium readable and/or writable by the processor (including, for example, volatile and non-volatile memory and/or storage elements), an input device, and an output device. Program code may be applied to input entered using the input device to perform the functions described and to generate output using the output device.

Embodiments of the present invention include features which are only possible and/or feasible to implement with the use of one or more computers, computer processors, and/or other elements of a computer system. Such features are either impossible or impractical to implement mentally and/or manually. For example, embodiments of the present invention may use instrumentation to enable read/write (access/storage) requests to be intercepted automatically and thereby to enable existing systems to access secure data without being modified. Such techniques are inherently rooted in computer technology and cannot be implemented mentally or manually.

Any claims herein which affirmatively require a computer, a processor, a memory, or similar computer-related elements, are intended to require such elements, and should not be interpreted as if such elements are not present in or required by such claims. Such claims are not intended, and should not be interpreted, to cover methods and/or systems which lack the recited computer-related elements. For example, any method claim herein which recites that the claimed method is performed by a computer, a processor, a memory, and/or similar computer-related element, is intended to, and should only be interpreted to, encompass methods which are performed by the recited computer-related element(s). Such a method claim should not be interpreted, for example, to encompass a method that is performed mentally or by hand (e.g., using pencil and paper). Similarly, any product claim herein which recites that the claimed product includes a computer, a processor, a memory, and/or similar computer-related element, is intended to, and should only be interpreted to, encompass products which include the recited computer-related element(s). Such a product claim should not be interpreted, for example, to encompass a product that does not include the recited computer-related element(s).

Each computer program within the scope of the claims below may be implemented in any programming language, such as assembly language, machine language, a high-level procedural programming language, or an object-oriented programming language. The programming language may, for example, be a compiled or interpreted programming language.

Each such computer program may be implemented in a computer program product tangibly embodied in a machine-readable storage device for execution by a computer processor. Method steps of the invention may be performed by one or more computer processors executing a program tangibly embodied on a computer-readable medium to perform functions of the invention by operating on input and generating output. Suitable processors include, by way of example, both general and special purpose microprocessors. Generally, the processor receives (reads) instructions and data from a memory (such as a read-only memory and/or a random access memory) and writes (stores) instructions and data to the memory. Storage devices suitable for tangibly embodying computer program instructions and data include, for example, all forms of non-volatile memory, such as semiconductor memory devices, including EPROM, EEPROM, and flash memory devices; magnetic disks such as internal hard disks and removable disks; magneto-optical disks; and CD-ROMs. Any of the foregoing may be supplemented by, or incorporated in, specially-designed ASICs (application-specific integrated circuits) or FPGAs (Field-Programmable Gate Arrays). A computer can generally also receive (read) programs and data from, and write (store) programs and data to, a non-transitory computer-readable storage medium such as an internal disk (not shown) or a removable disk. These elements will also be found in a conventional desktop or workstation computer as well as other computers suitable for executing computer programs implementing the methods described herein, which may be used in conjunction with any digital print engine or marking engine, display monitor, or other raster output device capable of producing color or gray scale pixels on paper, film, display screen, or other output medium.

Any data disclosed herein may be implemented, for example, in one or more data structures tangibly stored on a non-transitory computer-readable medium. Embodiments of the invention may store such data in such data structure(s) and read such data from such data structure(s).

Any step or act disclosed herein as being performed, or capable of being performed, by a computer or other machine, may be performed automatically by a computer or other machine, whether or not explicitly disclosed as such herein. A step or act that is performed automatically is performed solely by a computer or other machine, without human intervention. A step or act that is performed automatically may, for example, operate solely on inputs received from a computer or other machine, and not from a human. A step or act that is performed automatically may, for example, be initiated by a signal received from a computer or other machine, and not from a human. A step or act that is performed automatically may, for example, provide output to a computer or other machine, and not to a human.

The terms "A or B," "at least one of A or/and B," "at least one of A and B," "at least one of A or B," or "one or more of A or/and B" used in the various embodiments of the present disclosure include any and all combinations of words enumerated with it. For example, "A or B," "at least one of A and B" or "at least one of A or B" may mean: (1) including at least one A, (2) including at least one B, (3) including either A or B, or (4) including both at least one A and at least one B.

Although terms such as "optimize" and "optimal" are used herein, in practice, embodiments of the present invention may include methods which produce outputs that are not optimal, or which are not known to be optimal, but which nevertheless are useful. For example, embodiments of the present invention may produce an output which approximates an optimal solution, within some degree of error. As a result, terms herein such as "optimize" and "optimal" should be understood to refer not only to processes which produce optimal outputs, but also processes which produce outputs that approximate an optimal solution, within some degree of error.

What is claimed is:

1. A method performed by at least one computer processor executing computer program instructions stored on at least one non-transitory computer-readable medium, the method comprising:
   (A) reading, from a plurality of data sources associated with a user, a plurality of data elements;

(B) identifying, for each data element in the plurality of data elements, a security level corresponding to the data element and an access level corresponding to the data element;

(C) storing, for each data element in the plurality of data elements, the security level corresponding to the data element and the access level corresponding to the data element;

(D) storing, in a data store associated with the user, each data element in the plurality of data elements using a storage method specified by the access level corresponding to the data element;

(E) receiving a request to access a particular data element in the data store associated with the user;

(F) determining whether the request to access the particular data element should be granted based on an access level corresponding to the particular data element;

(G) in response to determining that the request to access the particular data element should be granted, granting the request to access the particular data element; and (H) in response to determining that the request to access the particular data element should not be granted, not granting the request to access the particular data element;

wherein receiving the request to access the particular data element in the data store associated with the user comprises intercepting the request addressed to an application.

2. The method of claim 1, wherein storing, for each data element in the plurality of data elements, the security level corresponding to the data element comprises:
identifying security level corresponding to a particular one of the plurality of data elements; and
identifying an encryption method specified by the security level corresponding to the particular one of the plurality of data elements;
encrypting the particular one of the plurality of data elements using the encryption method specified by the security level corresponding to the particular one of the plurality of data elements to produce an encrypted data element; and
storing the encrypted data element in the data store associated with the user.

3. The method of claim 2, wherein encrypting the particular one of the plurality of data elements comprises encrypting the particular one of the plurality of data elements using a cryptographic key associated with the user.

4. The method of claim 1, further comprising processing a particular one of the plurality of data elements, comprising:
identifying a security level corresponding to the particular one of the plurality of data elements; and
identifying a processing method specified by the security level corresponding to the particular one of the plurality of data elements; and
processing the particular one of the plurality of data elements using the processing method specified by the security level corresponding to the particular one of the plurality of data elements.

5. The method of claim 1, wherein identifying, for each data element in the plurality of data elements, a security level corresponding to the data element comprises:
identifying a minimum security level;
identifying a security level requested by a user in association with the data element;
determining whether the minimum security level is greater than the security level requested;
if the minimum security level is determined to be greater than the security level requested, then associating the minimum security level with the data element;
otherwise, associating, with the data element, the security level requested by the user in association with the data element.

6. The method of claim 1, wherein associating an access level with a data element comprises:
identifying a default access level associated with the data element;
determining whether an override access level has been specified for the data element;
if no override access level has been specified for the data element, then associating the default access level with the data element;
otherwise, associating the override access level with the data element.

7. The method of claim 1, wherein determining the request to access the particular data element should be granted based on the access level corresponding to the particular data element comprises:
identifying an access requirement specified by the access level corresponding to the particular data element;
determining whether the request to access the particular data element satisfies the access requirement;
if the request to access the particular data element is determined to satisfy the access requirement, then granting the request to access the particular data element;
otherwise, denying the request to access the particular data element.

8. The method of claim 7, wherein determining whether the request to access the particular data element satisfies the access requirement comprises determining whether data received in connection with the request to access the particular data element satisfies the access requirement.

9. The method of claim 7, wherein determining whether the request to access the particular data element satisfies the access requirement comprises:
identifying information associated with a requestor from which the request to access the particular data element was received; and
determining whether the information associated with the requestor satisfies the access requirement.

10. The method of claim 9, wherein determining whether the information associated with the requestor satisfies the access requirement comprises determining whether the information associated with the requestor authenticates an identity of the requestor.

11. The method of claim 1, wherein intercepting the request addressed to the application comprises:
before intercepting the request addressed to the application, instrumenting code of the application to enable requests addressed to the application, including the request addressed to the application, to be intercepted.

12. The method of claim 1:
wherein a particular data element in the data store has a corresponding security level that specifies a storage requirement;
wherein the particular data element in the data store has a corresponding access level that specifies an access requirement; and
wherein the storage requirement differs from the access requirement.

13. The method of claim 1, wherein (B) comprises:
identifying a first corresponding security level for a first one of the plurality of data elements; and
identifying a second corresponding security level for a second one of the plurality of data elements;
wherein the first corresponding security level differs from the second corresponding security level.

14. The method of claim 1, wherein the plurality of data sources comprises a first data source having a first account associated with the user and a second data source having a second account associated with the user.

15. The method of claim 1, wherein (B) comprises:
identifying a first access level corresponding to a first one of the plurality of data elements; and
identifying a second access level corresponding to a second one of the plurality of data elements;
wherein the first corresponding access level differs from the second corresponding access level.

16. The method of claim 1, wherein (B) comprises using a model trained using machine learning to identify at least one of: (1) a security level corresponding to at least one of the plurality of data elements; and (2) an access level corresponding to at least one of the plurality of data elements.

17. The method of claim 1, further comprising:
deriving a new data element from a first one of the plurality of data elements in the data store associated with the user; and
identifying a requirement corresponding to the new data element;
wherein the requirement corresponding to the new data element differs from the requirement corresponding to the first one of the plurality of data elements.

18. A system comprising at least one non-transitory computer-readable medium having computer program instructions stored thereon, the computer program instructions being executable by at least one computer processor to perform a method, the method comprising:
(A) reading, from a plurality of data sources associated with a user, a plurality of data elements;
(B) identifying, for each of the plurality of data elements, a corresponding security level and a corresponding access level;
(C) storing, for each of the plurality of data elements, the corresponding security level and the corresponding access level;
(D) storing, in a data store associated with the user, each of the plurality of data elements using a storage method specified by the data element's corresponding security level;
(E) receiving a request to access a particular data element in the data store associated with the user;
(F) determining whether the request to access the particular data element should be granted based on the corresponding access level for the particular data element;
(G) in response to determining that the request to access the particular data element should be granted, granting the request to access the particular data element; and
(H) in response to determining that the request to access the particular data element should not be granted, not granting the request to access the particular data element;
wherein receiving the request to access the particular data element in the data store associated with the user comprises intercepting the request addressed to an application.

* * * * *